Figure 1:
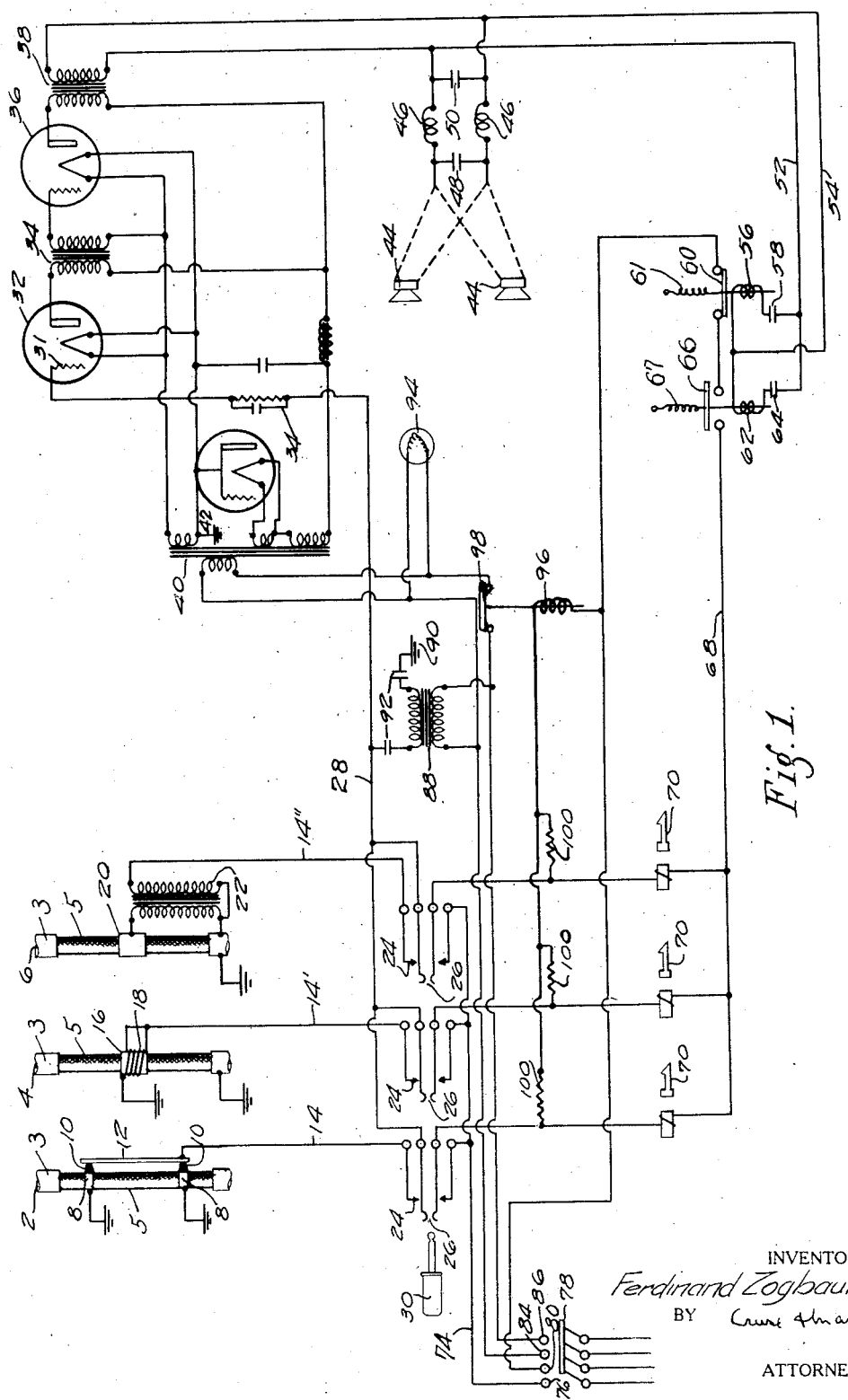

Sept. 10, 1929.  F. ZOGBAUM  1,727,387
SAFETY CONNECTION FOR HIGH TENSION CABLES
Filed March 24, 1927    2 Sheets-Sheet 1

INVENTOR
Ferdinand Zogbaum
BY
ATTORNEY

Patented Sept. 10, 1929.

1,727,387

UNITED STATES PATENT OFFICE.

FERDINAND ZOGBAUM, OF NEW ROCHELLE, NEW YORK.

SAFETY CONNECTION FOR HIGH-TENSION CABLES.

Application filed March 24, 1927. Serial No. 178,120.

The present invention relates to a safety mechanism to be used in generating and distributing stations, where high tension electric power is transformed or otherwise distributed to operating circuits. In such stations the high tension cables are ordinarily brought into boxes or compartments where proper connections are made for leading the current to any desired point. These compartments are ordinarily kept closed, but from time to time operators have to open the compartments to make repairs, adjustments, etc. No such compartment should be opened by an operator unless the power is turned off from the high tension line which enters it, but unfortunately mistakes are sometimes made and a man will open a compartment where the wires are charged, and will be killed or badly injured when he starts work on the wires. By my present arrangement, I render such accidents practically impossible.

In considering the problem that arises under the foregoing circumstances, it must be borne in mind that the high tension cable may be alive because it is carrying current from a generating station; or it may be disconnected at the generating station and simply connected to a live bus-bar in which case it is at a high potential but is not actually carrying current. Experience has shown that accidents of the type under discussion are more apt to occur in the latter case than the former, but both must be protected against.

I have found that mechanism which will either warn the operator or prevent the unlocking of the compartment, or both, can be operated by providing apparatus whereby when potential is present in the high tension cables (whether there is an actual flow of current or not) a secondary potential is induced in a separate circuit, which potential, by proper amplification, can be utilized to sound a warning device and at the same time can control locking mechanism so that when potential is present in the high tension cables, the compartments cannot be opened.

I prefer to combine both of these safety devices in one apparatus, but if desired one or the other may be used separately. I also include an auxiliary check circuit which must pass through the amplifying device, and so arrange the locking mechanism that unless this circuit is operative and the amplifier functioning properly, the doors cannot be opened.

The high tension cables are ordinarily brought into the compartments in conduits which may be cut off a short distance inside the box in which case the cables continue to the point of attachment covered with the ordinary insulation.

I have found when the high tension cables carry a dangerous potential, sufficient potential can be obtained to influence an amplifying relay, simply by attaching a metal plate or insulated wire adjacent the insulation of the cable at a point where the conducting conduit is removed. This metal which serves as a condenser plate should be carefully insulated from the cable and provision should be made for grounding the attaching means so that if there should be any break in the insulation of the cable, the safety circuits would not be burned out. If desired, this can be taken care of by using an insulating transformer but this is not necessary. Inasmuch as the high tension cables have a ground connection at the generator, a circuit can be completed by simply grounding the return of the lead from the condenser plate which I supply, although if desired a full two-wire circuit may be utilized by supplying a transformer which has its primary connected to the condenser plate and to the ground, and with the two-wire circuit connected to the secondary, as is well understood in the art. For the purpose of illustration, I here show only the one-wire system.

The energy obtained through the condenser is very small but by the use of amplifying apparatus similar to an ordinary audio-frequency amplifier used in the radio art, this energy can easily be built up sufficiently to sound a warning horn or to control locking mechanism. In order to bring the warning mechanism (which may be a howler operated like a loud speaker) into operation, mechanism is provided whereby a switch is closed when an operator seeks to open a compartment door, so that if the cable leading to that compartment is charged, the howler or other warning device will operate. I also find it advantageous to have the door locks electrically controlled and so connected that they cannot be opened unless the high tension cable is dead.

Figure 2:
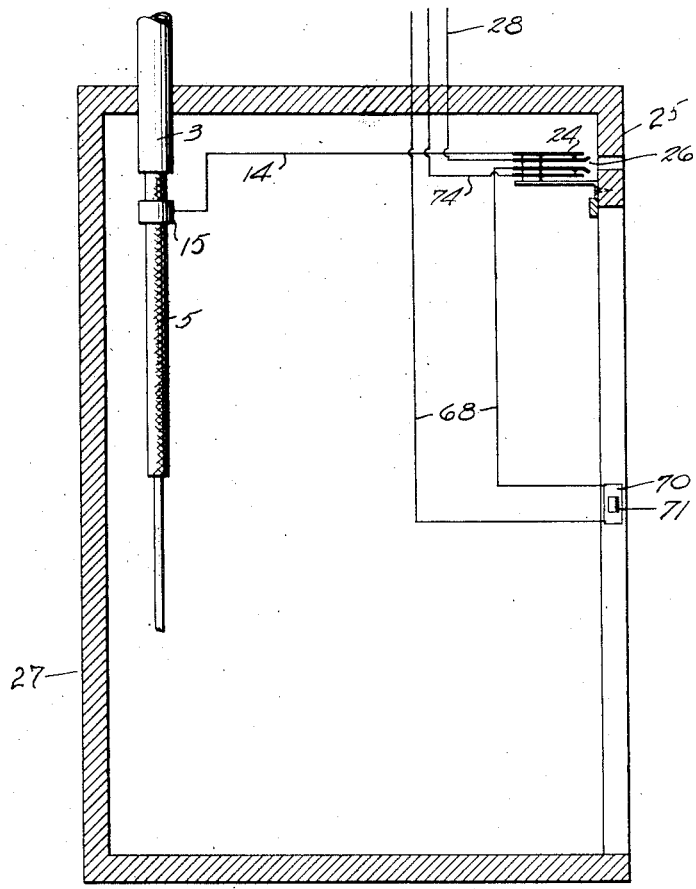

In the accompanying drawing, Fig. 1 shows diagrammatically a set of circuits which illustrate my invention, and Fig. 2 shows a section through the cable compartment with the wiring arranged diagrammatically. In these drawings, 2, 4 and 6 are high tension cables each one of which is understood to enter a separate compartment. For the purpose of illustration, I show a slightly different form of condenser arrangement with each of these cables, although in actual practice the same form (which might be one of the three forms shown, or some other slight modification) would probably be used on all of the cables.

The cable 2 is shown as carrying two grounded bands 8 on which are mounted two insulating bodies 10 to which is attached a metal plate 12 which parallels the cable 2 and serves as a condenser plate. A wire 14 leads from this condenser plate.

The cable 4 has a grounded metal sheath 16 around which is wrapped an insulated wire 18, both ends of which are connected to the wire 14'. This is a standard form of device known in the art as a sheath transformer.

The cable 6 carries a metal band 20 connected to the primary of an insulating transformer 22. The primary return and one end of the secondary of this transformer are both grounded. The other end of the secondary is connected to a wire 14''. In Fig. 2 a simple band of metal 15 serves as the condenser plate. At the points where the condensers in the various forms shown are attached to the cables the metal sheath 3 is cut away leaving the insulation 5 exposed.

With any of these arrangements, when the cable is alive, a small potential will be induced in the lead wire. Each of the lead wires 14, 14' or 14'', as the case may be, is connected to a contact point 24 of a jack 26 which preferably is built into the door frame of the door of the compartment into which the corresponding cable leads, there being a jack 26 for each such compartment. In Fig. 2 this jack is shown as located in the door frame 25 of the compartment 27.

The points of the jacks 26 which cooperate with the points 24 are connected in parallel with a main signal wire 28 in such a way that if a plug as 30 is inserted in any jack 26 a connection will be made between the wire 28 and a wire 14. The main signal wire 28 is connected with the grid 31 of an audion 32 and may be provided with the usual grid leak and condenser 34.

The audion 32 forms part of a power ampli- fier which includes the transformer 34, a second audion 36 and an output transformer 38. This amplifier is operated through a power transformer 40, and while the parts of the amplifier are illustrated diagrammatically, I will not describe the same in detail, as they are of standard construction and the details form no part of my invention. It may be noted, however, that the filament return is grounded at 42 to complete the circuit that starts from ground at the generator (which is grounded in the usual manner) passes through the cable, across the condenser on the cable, through the wire 14, the main signal wire 28, the audion 32, and back to ground at 42.

The secondary of the output transformer 38 is connected to one or more howlers 44. One of these howlers should always be placed adjacent the compartments into which the high tension cables lead and a second may be placed in the control room or at any desired point in the station. The leads to the howlers 44 are provided with a filtering device consisting of coils 46 and condensers 48 and 50 which are so tuned as to permit only the same frequency to pass to the howlers as is present in the high tension cables. This frequency may vary in different stations, but for the purpose of illustration I will assume that the high tension cables are operated on a frequency of 25 cycles.

Likewise connected to the secondary of the transformer 38, in parallel with the howlers 44, are two leads 52 and 54. The lead 54 is connected to one end of a relay 56 and the other end of this relay is connected to the lead 52 through a condenser 58 of such capacity that the relay 56 will be resonant to and will be operated only at a frequency of 25 cycles or the same frequency as is used in the high tension cables. The relay 56 is adapted to open a switch 60 which is normally closed as indicated by the tension spring 61.

The lead 52 is also connected to one end of a relay 62, the other end of which is connected to lead 54 through the condenser 64 of such capacity that the relay 62 will be resonant to and will be operated only by a frequency substantially different from that present in the high tension cables. As I have presumed that the high tension cables are operated at a frequency of 25 cycles, I will presume that the relay 62 will operate only at a frequency of 60 cycles. It is to be understood that these frequencies may be varied as desired, so long as the relay 56 operates at the frequency of the high tension cables and the relay 64 operates at a different frequency. The relay 62 controls a switch 66 which is normally open as indicated by the tension spring 67.

The switches 60 and 66 are in series with each other and are connected to a lead 68 to which the door-locks 70 are connected in parallel. It is to be understood that one of these locks is provided for each compartment and these locks may be of any type in which current must be passed through the lock in order that the door may be unlatched.

Each lock 70 is connected to one of the contact points of its corresponding jack 26 by a lead 72. The other cooperating contact point of each of these jacks is connected (with the connections in parallel) to a lead 74 which is connected to the pole 76 of the four-pole switch 78. The second contact pole 80 of the switch 78 is connected to a lead 82 adapted to complete a circuit through the switches 60 and 66. The arms of switch 78 which contact with poles 76 and 80 are connected to any desired source of power adapted to operate the door-locks 70, such, for example, as a direct current of 120 volts.

The switch poles 84 and 86 of the switch 78 are adapted to deliver alternating current (of a different frequency from that in the high tension cables, for example current with a frequency of 60 cycles) to the primary of a transformer 88. The secondary of this transformer has one end connected to the ground at 90 and the other end connected to the main signal wire 28. Condensers 92 are interposed in these connections to prevent the transformer winding from shunting (short circuiting) the main signal wire 28. The primary of the power transformer 40 is connected in parallel with the primary of transformer 88, and the arms of switch 78 which contact with poles 84 and 86 are connected to any appropriate source of current such as a current of 120 volts at a frequency of 60 cycles. If desired, a lamp 94 may be connected in parallel with the primaries of transformers 88 and 40 to show when the switch 78 is closed.

When it is desired to open the door of any compartment, the operator must first close switch 78 which will cause power to be supplied to the transformer 40 thus bringing the power amplifier into operation. If this amplifier is functioning properly, current with a frequency of 60 cycles, induced in the circuit by transformer 88, will pass through the amplifier and operate relay 62 thus closing the switch 66. The howlers 44 and switch 60 will not be affected, as they are not in resonance with this frequency.

In order to open the door of the desired compartment, the operator inserts a plug as 30 into the appropriate jack 26. If the corresponding high tension cable is dead, there will be no potential in the corresponding lead 14 and the howlers 44 and switch 60 will remain unaffected. The circuit from lead 72 to lead 74 will also be closed, completing the circuit through the corresponding door latch 70, permitting the door to open. On the other hand, if the high tension cable is carrying potential this will be amplified in the power amplifier and will sound the howlers 44, and will open switch 60, thus both giving a warning that the high tension cable is charged and preventing the door from being unlocked.

It will be noted that if for any reason the power amplifier fails to function, the 60 cycle current produced in the circuit through the transformer 88 will not pass through to relay 62, so that switch 66 will remain open, and even though the howlers 44 do not sound, the doors cannot be unlocked. In other words, the greater part of the system must be positively operated for the doors to open, and the number of leads and connections where the absence of potential permits the doors to operate is kept at a minimum, so that every time that the device is brought into operation, whether or not the corresponding cable is alive, a check is had on whether the system is fully operative.

In the event that it is desired to keep the switch 78 closed, a relay may be interposed in the circuit leading to the primary of transformer 40. Such a relay is indicated at 96. The relay operates a switch 98 but it is to be understood that if this switch is not used the circuit is not to be broken at this point. The relay 96 will be connected to the lead 82 and will have connected to it in parallel the various leads 72. Resistances 100 should be interposed in order to prevent all of the door locks 70 from being operated when any one door lock 70 is operated. This means that the relay 96 must operate at a lower voltage than the door locks 70.

With this arrangement, the switch 78 can be kept closed but no current will pass through the amplifier until a plug 30 is inserted in jack 26. This will close switch 98, bringing the amplifier into operation and lighting lamp 94. As soon as the work is finished and the compartment closed and plug 30 withdrawn, the lamp 94 will go out, and the power will be cut off from the amplifier.

In the example indicated, two types of danger indication may be given: one by the howlers and the other by the failure of the locks to operate. Conversely silence of the howlers and the operation of the lock is a safety indication, though this is not positive in the case of the howlers as they are not here shown as controlled by a current of different frequency from the potential of the cable. The term "different frequency" is intended to include the case where such supervisory current is direct while the other is alternating. It is obvious that other types of danger or safety indications may be used and that many other modifications may be made without departing from the spirit of my invention.

What I claim is:

1. In combination with a high tension cable, a condenser plate adjacent the cable, a signal circuit connected with such condenser plate, danger indicating mechanism connected with said circuit adapted to be operated by a potential charge in said condenser plate derived from the cable, means for influencing said signal circuit with potential of a different frequency from that of the cable and means connected with said circuit resonant to such different frequency whereby a danger indication will be given if said resonant means is not influenced by such different frequency.

2. In combination with a high tension cable, a safety device comprising a condenser plate adjacent said cable, an amplifying device, means including a manually operable switch for connecting said condenser plate with said amplifying device, means for influencing said amplifier with potential of a different frequency from that of the cable, danger indicating mechanism operably connected with said amplifying device, means whereby a danger indication will be given if said cable is charged when said switch is closed and means connected with the amplifier resonant to such different frequency whereby when the switch is closed a danger indication will be given if said resonant means is not influenced by such different frequency.

3. In combination with a compartment having a door and a high tension cable entering such compartment, a signal circuit, means for charging the signal circuit from said cable with potential of a frequency corresponding to the frequency of the potential which may be in said cable, means for inducing in the signal circuit potential of a different frequency from that of the cable, an electrically controlled lock to be unlocked before opening said door, means for preventing said lock from operating and control means therefor adapted to hold said lock in locked position unless said signal circuit is free from potential derived from said cable but carries potential of such different frequency.

4. In combination with a compartment having a door and a high tension cable entering such compartment, a condenser plate adjacent the cable, an amplifying device, means including a switch for connecting said condenser plate with said amplifying device, an electrically controlled lock to be unlocked before opening said door, a circuit for said lock, an individual switch in said door-lock circuit, means whereby the circuit will be closed through said first switch when the switch is closed in the door-lock circuit, and a circuit breaker in said circuit adapted to be operated by energy delivered by said amplifying device whereby said lock will be prevented from unlocking when said condenser plate is charged by the action of potential in said cable.

5. A combination as specified in claim 4. which further includes a circuit for supplying power to said amplifying device and means whereby said circuit is opened or closed when said switches are opened or closed.

6. A combination as specified in claim 4, in which said circuit breaker is in resonance with a frequency corresponding to the frequency of the cable and which further includes a second circuit breaker in said lock circuit connected with said amplifying device and in resonance with a different frequency, and means for supplying potential of such different frequency to said amplifier, the circuit breaker resonant to the frequency of the high tension cable being normally closed and the other circuit breaker being normally open.

7. A safety device for use with high tension cables for alternating current, adapted to indicate whether such a cable is charged, which comprises in combination with such a cable, a condenser plate associated therewith, an amplifier, a switch for connecting said condenser plate with said amplifier, means for supplying to said amplifier current of different frequency from that supplied from said condenser plate, an indicating circuit adapted to give a danger indication or a safety indication, and relay control mechanism for said indicating circuit comprising two relays, the first being adapted for operation by power supplied from said amplifier corresponding to the frequency of current received by said amplifier from said condenser plate and the second being adapted for operation by power supplied from said amplifier corresponding to such different frequency, and connections for said relays such that upon closing said switch a danger indication will be given if said first relay is energized or said second relay is not energized and a safety indication will be given when said second relay is energized and said first relay is not energized.

8. A combination as specified in the foregoing claim in which both said relays are interposed in the indicating circuit and the first of said relays is normally closed and adapted to be opened when energized, and the second of said relays is normally open and adapted to be closed when energized.

FERDINAND ZOGBAUM.